United States Patent [19]
Burnham et al.

[11] Patent Number: 5,897,078
[45] Date of Patent: *Apr. 27, 1999

[54] MULTI-SERVICE COMMON AIRFRAME-BASED AIRCRAFT

[75] Inventors: Robert W. Burnham, Seattle; Michael F. Fitzpatrick, Bellevue; Dennis A. Muilenberg, Auburn; Joseph K. Schoebelen, Kent; Laurence B. Trollen, Issaquah, all of Wash.

[73] Assignee: The Boeing Company, Seattle, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/756,154

[22] Filed: Nov. 26, 1996

Related U.S. Application Data

[63] Continuation of application No. 08/572,814, Dec. 15, 1995.

[51] Int. Cl.⁶ ........................................... B64C 1/00
[52] U.S. Cl. .................. 244/177 R; 244/124; 244/120; 244/12.4
[58] Field of Search ................................ 244/117 R, 124, 244/120, 53 B, 55, 12.5, 12.4, 15, 12.3

[56] References Cited

U.S. PATENT DOCUMENTS

| | | |
|---|---|---|
| 2,211,089 | 8/1940 | Berlin . |
| 2,310,765 | 2/1943 | Dornier . |
| 2,390,761 | 12/1945 | Watter . |
| 2,504,422 | 4/1950 | Johnson et al. ........................ 244/120 |
| 2,777,655 | 1/1957 | Graham . |
| 2,997,262 | 8/1961 | Kirk et al. . |
| 3,176,463 | 4/1965 | Bauger et al. . |
| 3,273,339 | 9/1966 | Borysthen-Tkacz ................... 244/12.3 |
| 3,278,138 | 10/1966 | Haberkorn . |
| 3,318,097 | 5/1967 | Wood et al. . |
| 3,469,803 | 9/1969 | Schmielau . |
| 3,602,460 | 8/1971 | Whittley et al. . |

(List continued on next page.)

FOREIGN PATENT DOCUMENTS

| | | |
|---|---|---|
| 41 31 569 | 3/1993 | Germany . |
| 4218197 | 12/1993 | Germany ............................... 244/120 |

OTHER PUBLICATIONS

Avation Week & Space Technology, Sep. 25, 1995, *Moving Inlet Picked for JAST*, p. 34, *Boeing's JAST Design,Testing Proceed Apace*, pp. 53, 54.

Avation Week & Space Technology, vol. 117, No. 25, Dec., 1982, New York US, "*Studies See Improved Military Capability for V/STOL Aircraft*", pp. 55–59, W.B.Scott, whole document.

Avation Week & Space Technology, vol. 142, No. 19, May 8, 1995, p. 24, "Announcement", whole document.

International Defense Review, vol. 24, No. 12 Dec. 1991, Cointrain–Geneva, CH, pp. 1343–1348, B. Sweetman, "Which way forward for advanced STOVL?", whole document.

Scott, William "Studies See Improved Military Capability for V/STOL Aircraft." Aviation Week Dec. 1982.

Epstein, Charles, "Taking the drag out of bombs". Flight International Aug. 21, 1982 p. 418–420.

*Primary Examiner*—Charles T. Jordan
*Assistant Examiner*—Tien Dinh
*Attorney, Agent, or Firm*—Mary Y. Redman

[57] ABSTRACT

A modular approach to the manufacture of high performance military aircraft allows different aircraft to be manufactured at affordable cost and with high part number commonality. An aircraft so constructed includes a delta wing; a forebody section, including a cockpit, which is mounted to the front of the wing; and a propulsion system support frame mounted beneath the forebody section and the underside of the wing. The propulsion system is supported within this frame. The aircraft can also include an aftbody section mounted to the aft end of the wing, which includes a 2-D variable thrust vectoring nozzle and a pair of canted vertical tails. The forebody section includes a chin inlet below the cockpit. The wing is preferably constructed using thermoplastic welding.

4 Claims, 5 Drawing Sheets

U.S. PATENT DOCUMENTS

| | | |
|---|---|---|
| 3,823,897 | 7/1974 | Bloomquist . |
| 3,942,746 | 3/1976 | Carter et al. . |
| 3,972,490 | 8/1976 | Zimmermann et al. . |
| 4,120,998 | 10/1978 | Olez . |
| 4,248,041 | 2/1981 | Wilde et al. . |
| 4,343,446 | 8/1982 | Langley . |
| 4,356,616 | 11/1982 | Scott . |
| 4,506,848 | 3/1985 | Fletcher et al. . |
| 4,580,746 | 4/1986 | Peck ......................................... 244/120 |
| 4,714,197 | 12/1987 | Thayer et al. . |
| 4,735,381 | 4/1988 | Wood ...................................... 244/120 |
| 4,736,910 | 4/1988 | O'Quinn et al. ........................ 244/120 |
| 4,896,845 | 1/1990 | Peretti et al. ........................... 244/120 |
| 4,919,364 | 4/1990 | John et al. . |
| 5,161,741 | 11/1992 | Seyfang . |
| 5,174,502 | 12/1992 | Lippmeier et al. ................. 239/265.19 |
| 5,445,861 | 8/1995 | Newton et al. . |

MULTI-SERVICE COMMON AIRFRAME-BASED AIRCRAFT

This application is a continuation of application Ser. No. 08/572,814, filed Dec. 15, 1995.

BACKGROUND OF THE INVENTION

1. Field of the Invention

This invention relates to aircraft and airframe structures and methods for manufacturing them. More particularly, it relates to airframes designed for modular fabrication with a high degree of parts commonality for different aircraft based on the same airframe.

2. Background Information

The requirements for modern military aircraft are diverse. For example, some must be suitable for flight off an aircraft carrier. This involves the aircraft being compact and capable of taking off and landing within the constraints imposed by the carrier's physical dimensions. For some applications, a military aircraft must be capable of vertical landing. In others, conventional takeoff and landing capabilities are desired. There also may be differing requirements for cockpit configurations, weapons configurations, and the like.

Up to now, fabrication of military aircraft has been costly. In part, this is because aircraft manufacturers have met differing requirements for propulsion systems, flight regimes, cockpit configuration, and weapons configurations, by designing separate and different airframes for each set of requirements. This leads to high cost, since the lack of parts commonality makes any economies of scale impossible. Thus, high performance tactical aircraft at affordable cost has been difficult to achieve.

It has not been known, heretofore, how to develop a family of separate and distinct aircraft from a single common baseline airframe that can be easily modified to accommodate varying requirements for propulsion systems, cockpit configurations, etc. What is needed is an approach to aircraft manufacturing that leads to a high degree of commonality of parts and affordable cost and, at the same time, high performance using advanced technologies.

SUMMARY OF THE INVENTION

The invention involves a modular approach to the manufacture of high performance military aircraft. Using the claimed invention, aircraft meeting design requirements that differ in major areas such as propulsion system and cockpit configuration, can be manufactured with a high part number commonality which results in low cost for an advanced technology, high performance tactical aircraft. For example, the same airframe can be used for a short takeoff-vertical landing (STOVL) craft, or a conventional takeoff and landing (CTOL) craft, and for an aircraft carrier-based version (CV)—with a part commonality rate of over 90%.

This result is achieved by using a modular approach to construct the aircraft. For example, an aircraft can include a delta wing; a forebody section, including a cockpit, which is mounted to the front of the wing; and a propulsion system support frame mounted beneath the underside of the wing and extending from the forebody section to the rear or aft end of the wing. A propulsion system is supported within this frame.

In a preferred embodiment the wing is constructed of thermoplastic material. For low part count, welding can be used rather than fasteners. In a preferred embodiment, the aircraft would also include an aftbody section mounted to the aft end of the wing. This aftbody section preferably includes a propulsion system exhaust nozzle and a pair of canted vertical tails. The nozzle includes a pair of members moveable in relation to each other so as to vary the cross-sectional area of the nozzle. Rudders can be provided on the tail. The forebody section preferably includes an inlet frame defining an air intake inlet opening below the cockpit to direct air to the propulsion system.

BRIEF DESCRIPTION OF THE DRAWING(S)

FIG. 3 is a perspective bottom view of a preferred embodiment of the invention, with the outer skin removed to show internal structure.

DESCRIPTION OF THE PREFERRED EMBODIMENT(S)

To illustrate the invention, a particular preferred embodiment will be discussed. This is for purposes of illustration only and is not meant to limit the scope of the invention. Reference to FIGS. 1, 2, 3 and 4 will orient the reader to the overall configuration of the airframe. This aircraft 1 includes a forebody 28 which includes a cockpit 2; a blended delta planform wing 4; a pair of canted vertical tails 6,7; and a propulsion system unit which includes a propulsion system 10 held by a support frame 23. Referring to FIG. 3, the propulsion system 10 is located in the propulsion system support frame 23 along the centerline of the aircraft 1. A chin inlet 9 in the forebody section of the aircraft 1 provides for air intake into the propulsion system 10. An outlet nozzle 11 for the propulsion system 10 is provided at the tail end of the aircraft 1. Internal weapons bays 8 may be provided under the wing 4 adjacent the propulsion system support frame 23. Alternatively or additionally, weapons may be mounted externally below the wing.

Figure 1:
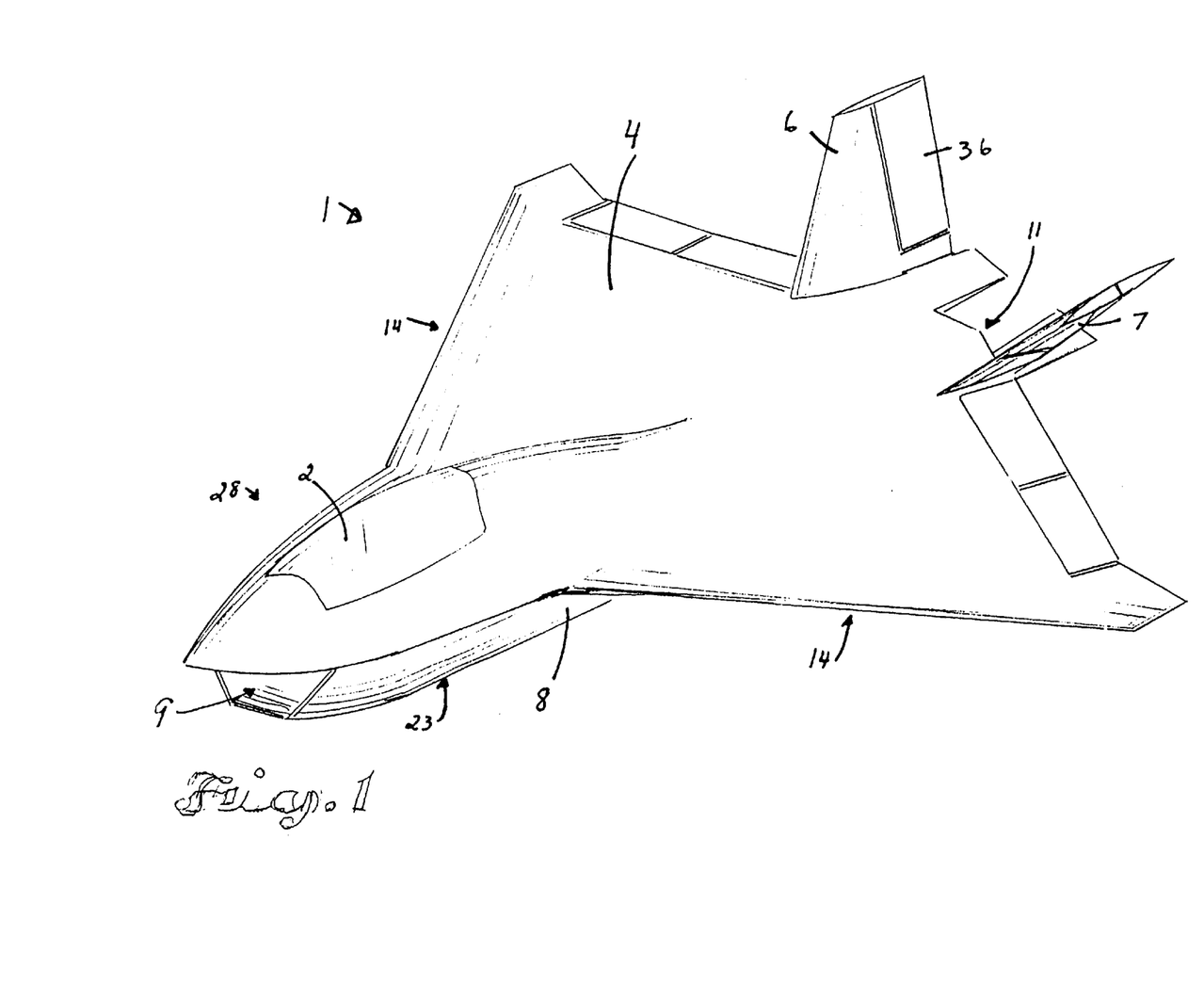
FIG. 1 is a perspective view of an aircraft according to a preferred embodiment of the invention.
Figure 2:
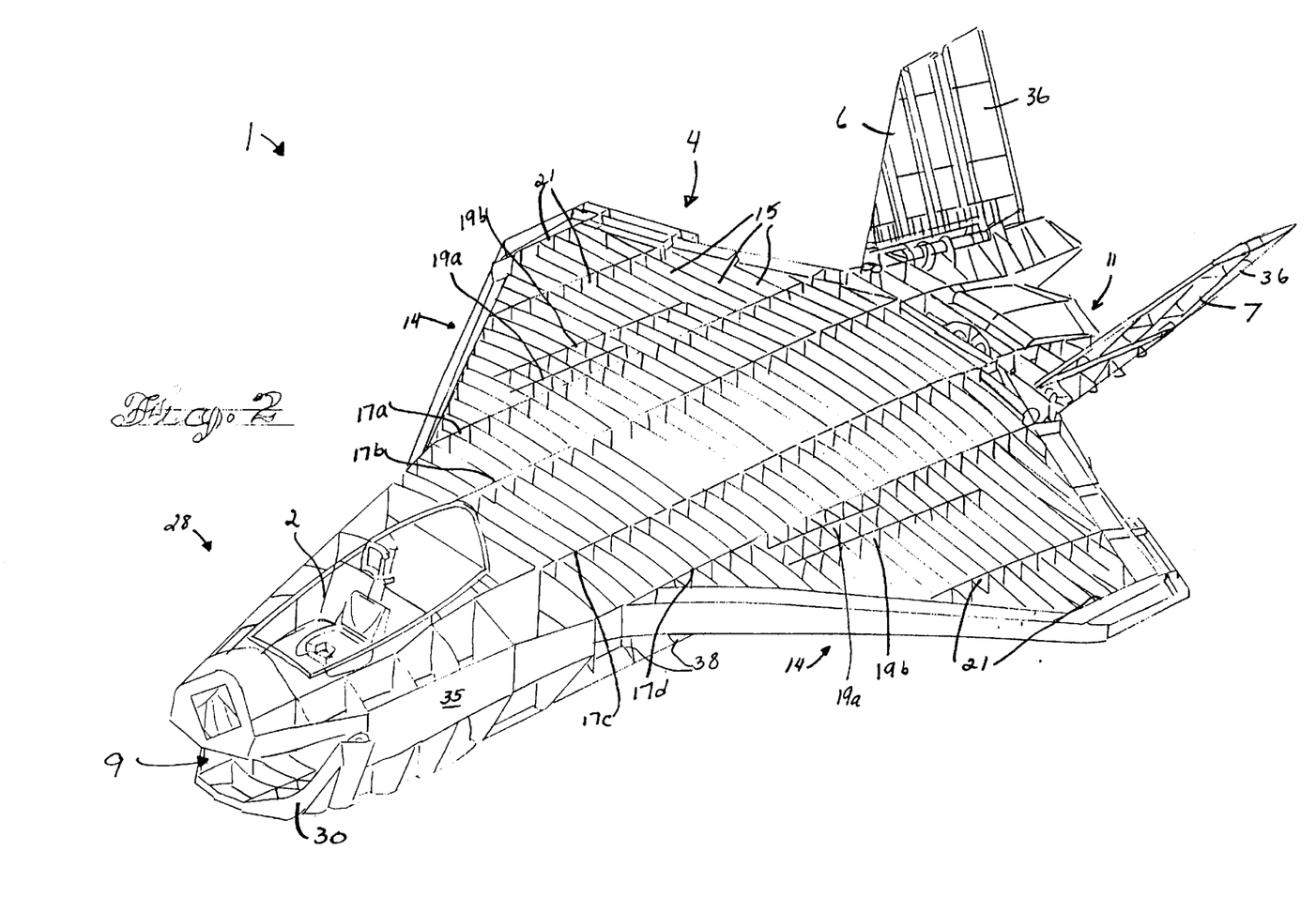
FIG. 2 is a perspective top view of a preferred embodiment of the invention, with the outer skin removed to show internal structure.
Figure 4:
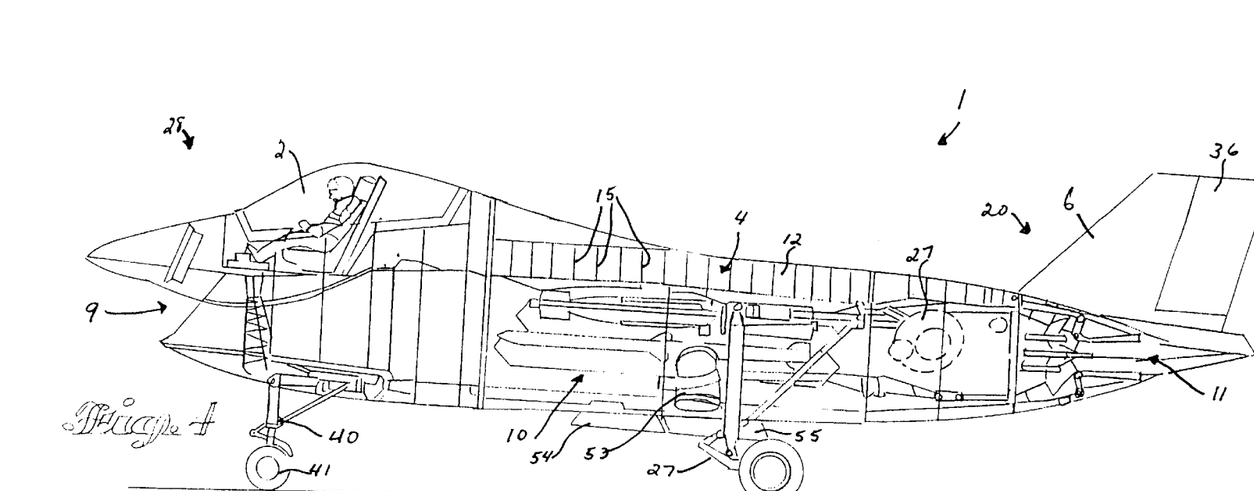
FIG. 4 is a partially cut-away side view of an aircraft according to a preferred embodiment.
Figure 5:
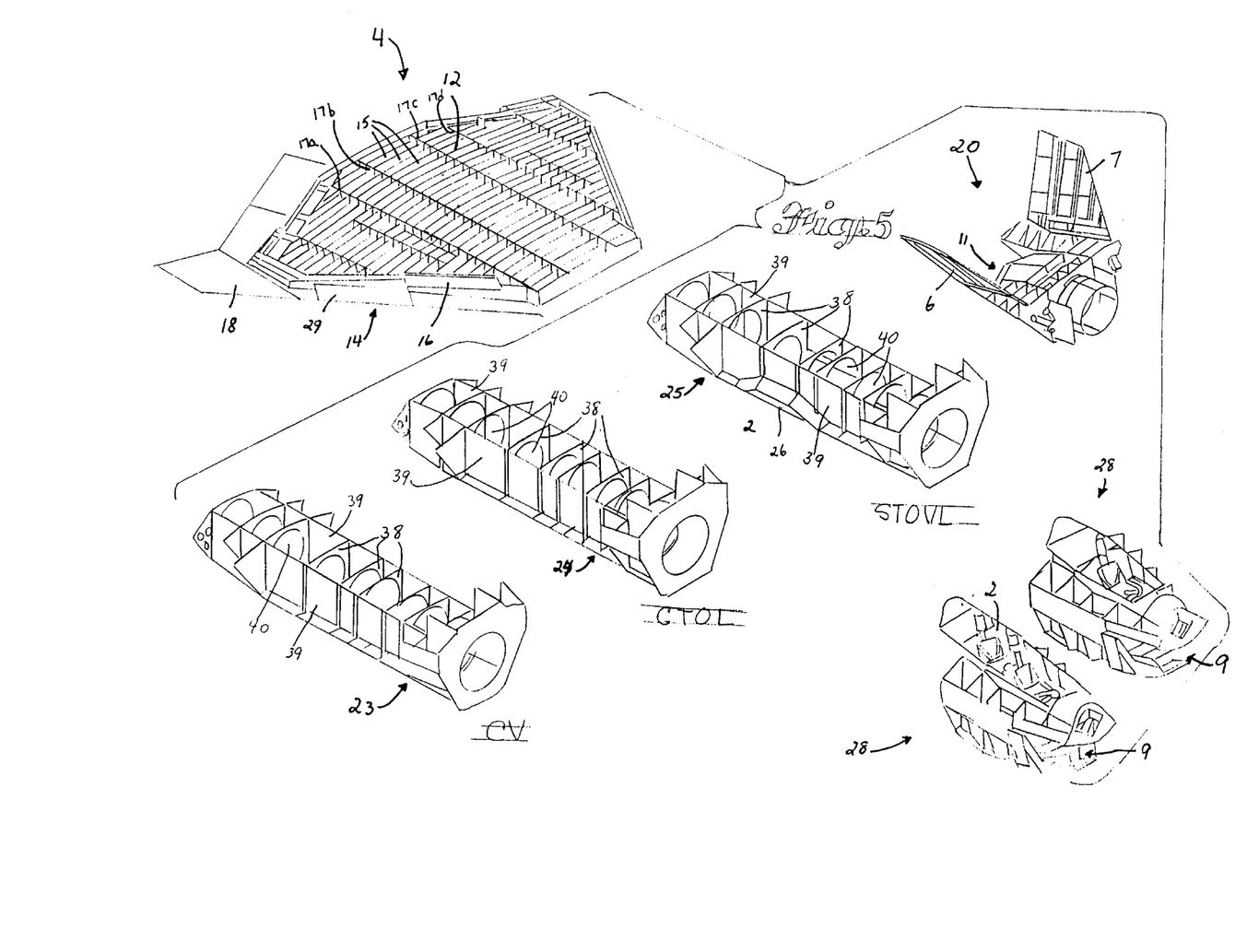
FIG. 5 illustrates major modular components of an aircraft according to a preferred embodiment, with outer skins removed to show internal structure.

FIG. 5 illustrates the major modular components which make up the aircraft 1. These are the wing 4; the aftbody/empennage 20 which includes the tails 6, 7 and outlet nozzle 11; the propulsion system unit (only the support frame 23 which houses the propulsion system is shown in this Figure); and the forebody 28 which carries the cockpit and the air inlet for the propulsion system. These modular components can be fabricated separately with whatever modifications are necessary for a particular fighter or other aircraft type and then assembled into the desired final configuration. The result is that several types of aircraft can be manufactured with a very high degree of part commonality of 90% or more.

The delta wing 4 is constructed as a single multi-spar wing box 12 which is common to all aircraft configurations. In a preferred embodiment, the wing 4 has a 55° leading edge sweep. The leading edge 14 can be adapted for CV aircraft by the addition of a leading edge vortex fence 16.

Other edge treatments can be chosen as desired to meet the requirements for a particular aircraft. For example, a high speed leading edge maneuver flap may be desired for CTOL configuration. A pair of clipped tips 18 with a leading edge flap 29 for maneuverability (shown on one side of the wing box only in FIG. 5) can be mounted to the outermost edges of the wing box 14 to adapt the wing box for use in CV and CTOL flight.

The wing box 12 is preferably manufactured from thermoplastic materials. It includes a series of substantially parallel spars 15 and ribs 17 and is preferably assembled by thermoplastic welding. The spars are preferably about ten inches apart. Four ribs 17a,b,c, and d run the length of the wing box in pairs. The two inboard ribs 17b, c are preferably positioned so as to line up with the fore/aft structure of the propulsion system support frame 23 and its major lengthwise rib members. The pair of outboard ribs 17a, 17d are positioned to provide stiffness for external store pylon locations.

Additional pairs of landing gear support ribs 19a, b provide support and a mounting structure for the main landing gear 27. Landing gear design can be chosen for the particular requirements desired. Inwardly retracting landing gear 27 mounted to the wing 4 have been found preferable for overall compactness. Pylon support ribs 21 are provided further outboard from the landing gear support ribs, near the wing tips. They provide support for weapons systems to be mounted external to the wing 4 if desired. The wing box's outer skin (shown in FIG. 1), which also is preferably thermoplastic material, can be attached by thermoplastic welding. Alternatively, the skins or other parts of the wing box structure could be attached by fasteners, or could be fabricated from thermoset materials or aluminum, although thermoplastic welded construction is favored for its low weight and low parts count.

The wing 4 has an overall blended delta planform shape with marked negative dihedral and a thin supersonic section. Its structure provides a chordwise bending stiffness normally provided by an aircraft body. It is the primary component of the aircraft 1, to which the other components are attached. Thus, the wing 4 serves the structural functions of both a wing and a body. In addition, it provides an internal fuel tank in its interior which is large enough to give the aircraft appreciable range.

The aftbody/empennage unit 20 includes the vertical canted tails 6,7 and a structurally integrated two-dimensional thrust vectoring nozzle 11 for the exhaust flow from the propulsion system (to be discussed below). A rudder 36 is provided on each tail 6, 7. The nozzle 11 includes a pair of hydraulically actuated members which can be selectively moved so as to increase or decrease the exit area for exhaust gases, or closed for STOVL operations.

The next modular component we will look at is the propulsion system unit. FIG. 5 shows three versions of a propulsion system support frame 23, 24, 25, suitable for CV, CTOL and STOVL flight respectively. Each support frame 23, 24, 25 has essentially the same structure, i.e., a series of parallel structural support members 38 having substantially circular apertures 40 through each, mounted between parallel lengthwise ribs 39 to form a frame for holding the propulsion system 10. The support frame 23 is preferably constructed primarily from titanium honeycomb. The basic frame configuration can be modified for different aircraft requirements. For example, the CV-adapted frame 23 includes structural modifications for cat/trap loads, while the STOVL frame 25 includes a structural modification along its ribs 39 near its midpoint to provide outlets 26 for lift jets.

Figure 6:
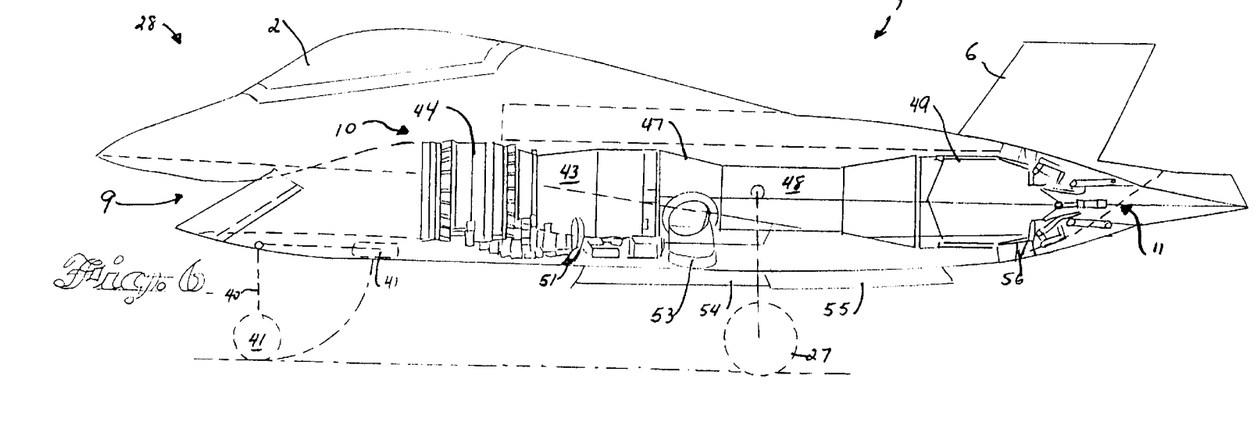
FIG. 6 shows detail of the propulsion system of a preferred embodiment, within a schematic drawing of the surrounding aircraft structure.

Referring to FIG. 6, the propulsion system 10 includes a high pressure ratio bypass fan jet engine 43, having bypass fan and compressor stage 44 which provides bypass fan air through bypass fan duct 45. Just aft of bypass fan duct 45 is turbine stage 46 and main lift nozzle plenum 47. Attached to main lift nozzle plenum 47 is tail pipe 48 which in turn connects with cruise nozzle 49 which outputs the fan air and exhaust through the nozzle 11, which preferably includes hydraulically actuated upper and lower jaws which can be hingedly moved toward or away from each other to provide the desired cross sectional outlet area, or to close the nozzle.

In an aircraft adapted for STOVL flight, main lift nozzle plenum 47 provides mixed bypass fan air and engine exhaust gases either to tailpipe 48 or selectively to main lift nozzles represented in FIG. 6 by left main lift nozzle 53. The main lift nozzles preferably can be rotated to the downward position shown in FIG. 6 for STOVL operation, or to provide short take-off assistance for wing-borne flight. They can also be rotated to a horizontal stowed position for wing-borne flight. A jet screen of compressed air to prevent uptake of debris into the engine is provided through jet screen nozzle 51. Variable area pitch nozzle 56 is under control in coordinated operation with jet screen nozzle 51 so that as one nozzle opens, the other closes to properly modulate pitch and to maintain constant the discharge flow area of engine 43. To maintain steady aircraft attitude on STOVL vertical landing, a pitch nozzle 58, a pair of yaw nozzles 59, and a pair of roll nozzles 60 are incorporated. These five nozzles along with the jet screen, form the attitude control system.

Forward left lift improvement device 54 and aft left lift improvement device 55 are duplicated on the right side of the aircraft as well to form a long trough on the bottom of the aircraft when these lift improvement devices are deployed. Front lift improvement device 52 extends from the forward ends of the right and left forward lift improvement devices to separate flow originating in the main lift nozzles from flow through the jet screen nozzle 51. The lift improvement devices are preferably rectangular plates positioned on the underside of the aircraft 1 to prevent flow of exhaust gas impinging upon a landing surface from returning to the aircraft bottom surface.

During normal forward flight, the lift improvement devices are all retracted to provide an aerodynamically efficient surface. During typical STOVL operations all lift improvement devices would be deployed for takeoff or landing and all lift improvement devices would be retracted to provide an aerodynamically efficient surface for normal forward operation. Lift improvement devices typically are hinged to the bottom surface of the aircraft 1.

The main lift nozzles 53, jet stream nozzles 51 and lift improvement devices could be eliminated if desired, for non-STOVL craft. In such case, the main lift nozzle plenum 47 would be replace by a plenum that directed bypass fan air and exhaust gases to the tailpipe 48.

The support to the propulsion system 10 given by the support frame 23 can best be appreciated by reference to FIG. 3. Structural support members 38 are preferably positioned on both sides of the major components of the propulsion system 10 to effectively carry the weight of these components.

The forebody 28 includes inlet frames 30 mounted between two chine beams 35 to form a chin inlet 11 for the propulsion system, and a cockpit 2 mounted above the inlet 11. The cockpit is contained in a pressure compartment and can be varied according to the desired configuration. For example, FIG. 5 shows a two seat cockpit 32 and a one seat cockpit 34, which can be interchanged according to the requirements of the particular aircraft being fabricated.

A forward landing gear 40 is mounted to the underside of the forebody 28, and fits within a well formed within its frame when retracted. For compactness, the front landing gear preferably retracts rearwardly, and its wheel 41 pivots to a position where its plane is generally parallel to the plane of the cockpit floor.

An aircraft 1 according to a preferred embodiment is assembled by mounting a forebody unit 28 to the front of the wing box 12, and mounting the propulsion system support frame 23, 24 or 25 with the propulsion system inside, to the underside of the wing box and lower rear face of the forebody. The aftbody/empennage 20 is then mounted to the rear of the wing box. The components are preferably mechanically fastened together after being jigged into position.

Other improvements, modifications and embodiments will become apparent to one of ordinary skill in the art upon review of this disclosure. Such improvements, modifications and embodiments are considered to be within the scope of this invention as defined by the following claims.

What is claimed is:

1. An aircraft comprising:
   a delta wing comprising a wing box including a plurality of ribs and spars formed of thermoplastic material, and having an underside, with a delta shape which is substantially symmetrical about a center line parallel to the direction of aircraft travel, said wing being configured to support a forebody section, an aftbody section, landing gear, a propulsion system support frame and a propulsion system;
   said forebody section including a cockpit mounted to the front of said delta wing and an inlet frame defining an air intake inlet opening below said cockpit;
   said propulsion system support frame including a plurality of substantially parallel support members mounted between a pair of lengthwise ribs, mounted to said wing beneath said forebody section and the underside of said wing;
   said propulsion system being held within said support frame, said propulsion system including lift nozzles adapted for rotation between a position where they are directed substantially perpendicular to the plane of the wing box, and a stowed position;
   an aftbody section mounted to the aft end of said wing, said aftbody section including a propulsion system exhaust nozzle, said propulsion system exhaust nozzle including a pair of members moveable in relation to each other so as to vary the cross-sectional area of the nozzle;
   said forebody, said propulsion unit and said aftbody being aligned such that said air inlet provides air to said jet engine and said tailpipe provides jet engine exhaust to said thrust vectoring nozzle; and
   landing gear mounted to said wing.

2. The aircraft of claim 1, wherein said aircraft is a short takeoff vertical landing type aircraft.

3. The aircraft of claim 2 further including means for receiving the exhaust from said jet engine and selectively providing same to said tailpipe and said pair of nozzles.

4. The aircraft of claim 1 wherein said aircraft is a conventional takeoff and landing type aircraft.

* * * * *

UNITED STATES PATENT AND TRADEMARK OFFICE
CERTIFICATE OF CORRECTION

PATENT NO. : 5,897,078
DATED : April 27, 1999
INVENTOR(S) : Robert W. Burnham, Michael F. Fitzpatrick, Dennis A. Muilenburg, Joseph K. Schnoebelen, Laurence B. Trollen It is certified that error appears in the above-indentified patent and that said Letters Patent is hereby corrected as shown below:

ON THE TITLE PAGE:
Item [75];

please correct the spelling of the third inventor's surname "Muilenberg", to -- Muilenburg -- please correct the spelling of the fourth inventor's surname "Schoebelen", to -- Schnoebelen --.

Signed and Sealed this

Fifth Day of October, 1999

Attest:

Q. TODD DICKINSON

*Attesting Officer*  *Acting Commissioner of Patents and Trademarks*